United States Patent [19]

Blake

[11] E Patent Number: Re. 33,205

[45] Reissued Date of Patent: Apr. 24, 1990

[54] LINEAR ANALOG LIGHT-LEVEL MONITORING SYSTEM HAVING SHORT LEADS TO REDUCE ELECTRONIC NOISE

[75] Inventor: Frederick H. Blake, Mill Creek, Wash.

[73] Assignee: Multipoint Control Systems, Inc., Mill Creek, Wash.

[21] Appl. No.: 185,099

[22] Filed: Apr. 22, 1988

Related U.S. Patent Documents

Reissue of:

[64] Patent No.: 4,647,763
Issued: Mar. 3, 1987
Appl. No.: 614,129
Filed: May 25, 1984

[51] Int. Cl.[5] ..... H01J 40/14

[52] U.S. Cl. ..... 250/214 AL; 315/158

[58] Field of Search ..... 250/206, 214 AL, 214 R; 315/158, 307, 321; 307/311, 117

[56] References Cited

U.S. PATENT DOCUMENTS

| | | | |
|---|---|---|---|
| 4,009,387 | 2/1977 | Nuver | 315/158 |
| 4,236,101 | 11/1980 | Luchao | 315/158 |
| 4,349,863 | 9/1982 | Petersen | 315/86 |

OTHER PUBLICATIONS

Energy Saver for Industrial Lighting, Arline et al., NASA Tech. Briefs, Fall, 1979, p. 407.

Linear Applications Handbook: National Semiconductor; National Semiconductor Corporation, Santa Clara, Calif., 1980; pp. AN211-1 through AN211-14 (See inventor's declaration for re-issue application, paragraph 10, pp. 6-7.).

Widlar, Robert J., "Working with High Impedance Op Amps," National Semiconductor Application Note 241, pp. 580-585.

"IC Op Amp Beats FETs on Input Current," *EEE*, Dec. 1969; pp. AN29-1 to AN29-20.

Stout, David, Handbook of Operational Amplifiers Circuit Design; 1976, McGraw-Hill Book Company, pp. 3-18 to 3-27 and Appendix III.

*Primary Examiner*—David C. Nelms
*Assistant Examiner*—William Oen
*Attorney, Agent, or Firm*—Bruce A. Kaser

[57] ABSTRACT

A system for monitoring the level of light at a distant location from a central location. A light sensor at the location to be monitored is comprised essentially of a photodiode and an operational amplifier and produces a high-level, analog output signal on an output signal line, the signal being linearly proportional to the level of light at the location. A control unit at a central location is electrically coupled to the sensor and comprises a power supply for providing electrical power to the sensor and a calibration device connected to the output signal line for providing a feedback signal to the sensor. The calibration device may be adjusted so that the output signal at the control unit bears a selected ratio to the light detected. A control unit having a single and power supply may be coupled to a plurality of sensors.

24 Claims, 1 Drawing Sheet

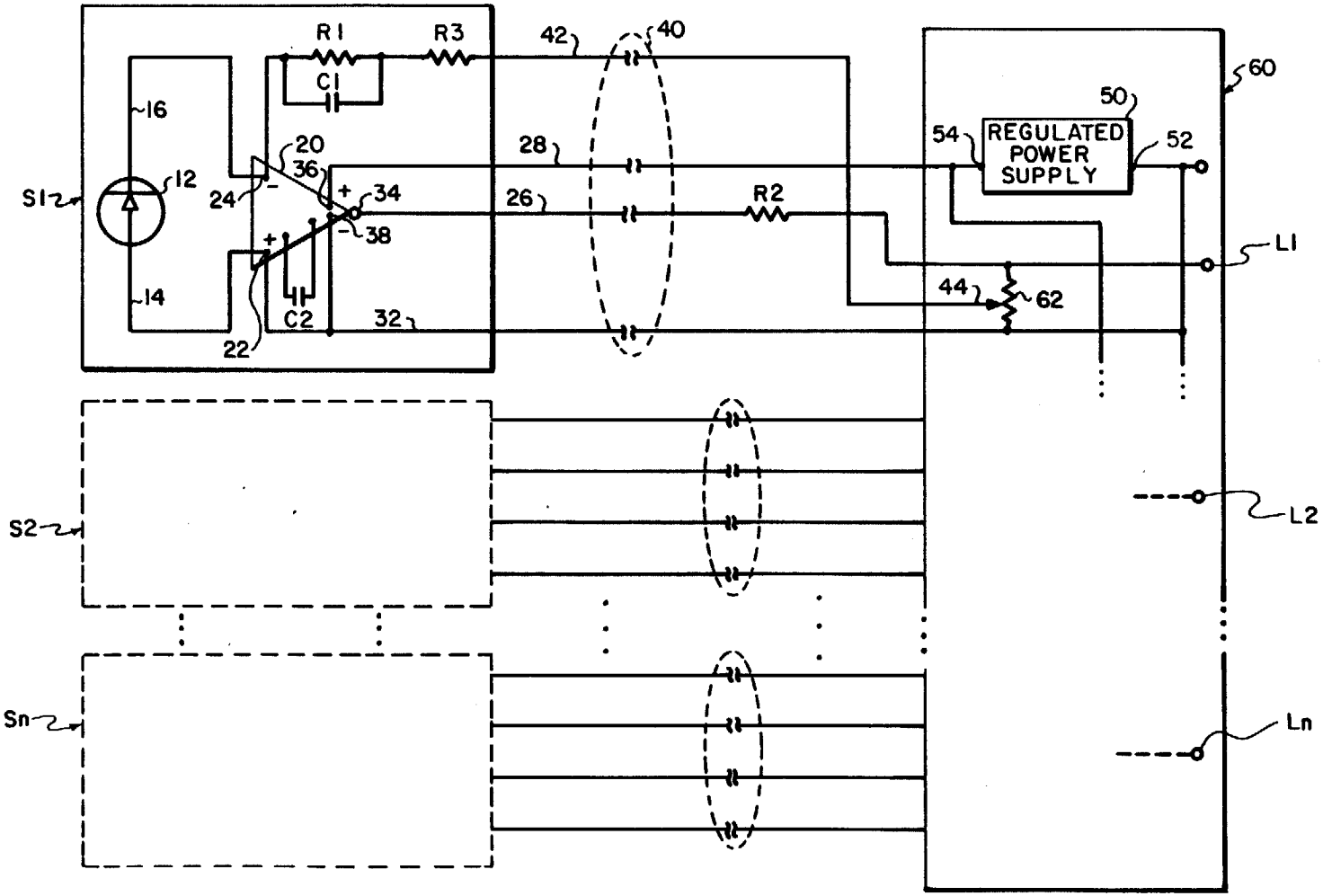
60
L1
L2
Ln
52
50
REGULATED POWER SUPPLY
54
62
44
R2
40
42
28
26
R3
R1
C1
34
38
32
20
36
C2
24
22
12
16
14
S1
S2
Sn

LINEAR ANALOG LIGHT-LEVEL MONITORING SYSTEM HAVING SHORT LEADS TO REDUCE ELECTRONIC NOISE

Matter enclosed in heavy brackets [ ] appears in the original patent but forms no part of this reissue specification; matter printed in italics indicates the additions made by reissue.

BACKGROUND OF THE INVENTION

This invention relates to a light-level monitoring system for monitoring the level of light in a distant location or in a plurality of distant locations from a central location. The present invention is particularly useful when coupled with a controller for adjusting the power to light fixtures in the monitored areas.

The need to regulate and conserve energy by automatically controlling lighting is well known. In an automatic lighting control system a controller adjusts the power to a light fixture in response to a signal from a light-level monitor. In the prior art most monitoring and control systems are localized systems controlling one or a few light fixtures. Each localized system requires a light-level monitor, a controller, and generally a power supply. Therefore, the monitor and controller must be of a very unsophisticated nature to reduce costs. Therefore, it is desirable to have a centralized monitoring system wherein a multiplicity of light-level sensors are coupled to a single power supply and controller.

It is further desirable to have a centralized monitoring system wherein the signal to the controller representing the light-level at each location is linearly proportional to the light-level at that location and bears a known relationship to the light level. With such information, the controller may always be aware of the true light-level in each location and can easily make adjustments as required.

It is further desirable that the signal-to light-level ratio of all of the signals at the control unit be identical. If this is true, the controller needs only to use one method of interpreting the signals to determine the light level signified.

It is also desirable that the signal from the local light sensors to the control unit be of high enough order than any electrical "noise" or "smog" not affect the resolution.

It is further desirable that the installation of such a system be simple so that it may be accomplished by a layman or, at most, by an electrician and not require an electronic technician.

It is further desirable that the system is readily adaptable to incorporate "Contrast Control" as disclosed in U.S. Pat. No. 4,229,664 for PHOTOELECTRIC METHODS AND APPARATUS FOR REGULATING ELECTRICAL POWER CONSUMPTION IN STORES, issued Oct. 21, 1980.

SUMMARY OF THE INVENTION

The deficiencies of the prior art are overcome by the present invention. In an exemplary embodiment, a linear analog light-level monitoring system monitors the level of light at a distant location from a control location. The system generally comprises a light sensor at the distant location to be monitored for producing an output signal that is linearly proportional to the level of light at the location; an output signal line for conveying the output signal to a control unit at the central location; a central location further comprising a power supply for furnishing electrical power to the sensor and calibration means connected to the output signal line for providing a feedback signal to the sensor so that the output signal at the control unit bears a selected linear ratio to the level of light detected and is stable; means for conveying power from the power supply to the sensors; and means for conveying the feedback signal from the calibration means to the sensor. According to a further precept of the invention, a plurality of localized light-level sensors are electrically coupled to the control unit.

The localized light sensor generally comprises a photodiode and an operational amplifier. The photodiode is connected across the inputs to the operational amplifier. The voltage across the photodiode, varies linearly with the amount of light striking the diode. The photodiode may be mounted in any suitable position for detecting the light level at the location to be monitored but it is generally ceiling-mounted and covered by a white, translucent plastic cap to disperse the incoming light so that the photodiode sees an average of the light at the location. Because the photodiode operates at extremely low current levels; the photodiode leads are very short, approximately one-eighth inch or shorter, to avoid the pickup of electronic noise. The entire sensor is small and therefore ascetically acceptable to room decor.

The operational amplifier isolates the noise-sensitive and current-sensitive photodiode and produces an output voltage that is linearly proportional to the output voltage of the photodiode but is not current sensitive.

A regulated, 12-volt, direct current power supply at the centrally located control unit supplies power to the sensor. A feedback circuit electrically connects the calibration means at the control unit to the positive input of the operational amplifier. By adjusting the calibration means and thereby controlling the feedback to the operational amplifier, the sensor signal at the control unit can be made to bear a selected ratio to the light level at the distant location. In a preferred embodiment, the sensor signal at the control unit is calibrated so that each volt represents 100 footcandles of light intensity at the sensor. Tests have shown this output to be linear within 1% in the 25–360 footcandle range, which is more sensitive than the human eye can detect. Once the monitoring system for each location is calibrated, it does not require further adjustment.

A lighting controller connected to the monitor at the control unit can be used to control the light intensity in the locations monitored. Output signals which are matched and linear allow use of a simple controller. However, the system is conducive for use with a more sophisticated controller such as a micro-computer. The low voltage and low power requirements of the system of the present invention allow the use of connecting wiring which is classed under Article 725 of the National Electrical Code as Class 2. Therefore, no conduit is needed, and the connecting wire can be laid over suspended ceiling systems in already constructed buildings. Ordinary 26-gauge colorcoded telephone cable may be used.

Other features and many attendant advantages will become more apparent upon a reading of the following detailed description together with the drawings wherein like reference numerals refer to like-parts throughout.

BRIEF DESCRIPTION OF THE DRAWING

The drawing is a schematic block diagram of a preferred embodiment of the present invention.

DETAILED DESCRIPTION OF THE INVENTION

With reference now to the drawing, there is shown a schematic diagram of a preferred of light-level monitoring system of the present invention. The system generally comprises a plurality of remotely located light sensors S1, S2, . . . Sn, a centrally located control unit 60, and electrical lines 40 connecting the light sensors S1, S2, . . . Sn with the central location 60. A light sensor S1, S2, . . . Sm, located at each location at which the level of light is to be monitored, is comprised generally of a photodiode 12, an operational amplifier 20 having positive input terminal 22 and negative input terminal 24, and a feedback circuit generally comprising a resistor R1, a capacitor C1, and an internal resistance R3. The photodiode 12, having input lead 14 and output lead 16, is exposed to the light at the location to be monitored. The photodiode input lead 14 is connected to the positive input 22 of the operational amplifier 20. The photodiode output lead 16 is connected to the negative input 24 of the operational amplifier 20. The voltage across the photodiode 12 varies linearly with the amount of light striking the diode. A Vactec No. VTB8442B Blue Enhanced or similar commercially available photodiode may be used. The photodiode 12 may be mounted in any suitable position for detecting the light level at a location. In the preferred embodiment the photodiode 12 is ceiling mounted and covered by a white translucent plastic cap that disperses the incoming light to be detected so that the photodiode 12 sees an average of the light at the location. The photodiode 12 operates at extremely low current levels making, the voltage signal on the photodiode input and output leads 14 and 16 highly susceptible to electrical noise. Therefore, the photodiode 12 input and output leads 14 and 16 are typically very short, approximately one-eighth inch or shorter. In addition amplifier 20 for the photodiode 12 must be within close proximity of the photodiode 12, preferably within one-quarter inch since the photodiode 12 must be exposed to the light at the location amplifier 20 should be as unobtrusive and as small as possible to avoid blockage of light sensed by photodiode 12. In the preferred embodiment of the present invention, the amplifier 20 is small, five-eights by seven-eights inches, so it meets the size and unobstruction to incoming light requirements and can be mounted directly adjacent the photodiode 12. The output voltage of the photodiode 12 is linearly proportional to the level of light detected.

The operational amplifier 20 isolates the noisesensitive and current-sensitive photodiode 12 and produces an output voltage at the output voltage terminal 34 which is linearly proportional to the output voltage of the photodiode 12 but which is not current sensitive. An operational amplifier output line 26 having an internal resistance R2, connects the output voltage terminal 34 with the control unit 60.

A regulated, twelve-volt, direct-current power supply 50 at the centrally located control unit 60 has negative terminal 52 and positive terminal 54. A positive power line 28 supplies power to the operational amplifier 20 at a positive power terminal 36 from the positive terminal 54 of the power supply 50. A negative power line 32 supplies power to the operational amplifier 20 at a negative power terminal 38 from the negative terminal 52 of the power supply 50. The negative power line 32 is also electrically connected to the positive input terminal 22 of the operational amplifier 20. The negative input 24 to the operational amplifier 20, in addition to being connected to the photodiode output lead 16, is connected to a feedback circuit comprised of an internal resistance R3; a resistor R1; a capacitor C1; connected across the leads of the resistor R1 for preventing oscillation and suppressing electrical noise; and a feedback connecting line 42 which is connected to adjustment contact 44 of a calibration potentiometer 62 at the central location 60. One lead of the calibration potentiometer 62 is connected to the operational amplifier output line 26 and the other lead is connected to the negative power line 32. The output voltage of the operational amplifier 20 on the operational amplifier output line 26 is linearly proportional to the light detected by the photodiode 12. The proportionality factor between volts out at the control unit 60 output terminal L1 to the light intensity detected by the photodiode 12 is determined by the total resistance between the output voltage terminal 34 and the negative input 24. This resistor is comprised of feedback circuit resistors R1 and feedback line internal resistance R3, output line internal resistance R2 and the resistance of the calibration potentiometer 62 between the output line 34 and the adjustment contact 44. Since the internal resistances R2 and R3 are dependent upon the distance between the control unit 60 and the sensor S1 and upon the size and type of wire used, the values of R2 and R3 vary with each location.

To calibrate the system, each location is calibrated as follows. At the location monitored by sensor S1, the photodiode 12 is exposed to a known light intensity and at the control unit 60 a voltmeter is connected to the control unit output terminal L1. The adjustable contact 44 is adjusted on the calibration potentiometer 62 until the desired voltage is read at the output terminal L1. The negative terminal 52 of the power supply 50 serves as a common negative for the output terminals L1, L2 . . . Ln. In this manner the light-level monitoring system of the present invention is easily calibrated.

The operational amplifier 20 may be an RCA-CA 3130, in which case capacitor C2 acts as a frequency stabilizer and prevents oscillation. Other amplifiers, such as the RCA-CA 3140, have integrated capacitor C2 into the amplifier. In a preferred embodiment resistance R1 is 100,000 ohms; capacitor C1 is 0.1 microfarads; capacitor C2 is 47 pico farads, and the calibration potentiometer 62 is 10,000 ohms. Using these values, the voltage at the output terminal L1 can be varied with the calibration potentiometer 62 so that each volt represents 100 footcandles of light intensity at the sensor S1. Thus, the light intensity at the sensor can always be determined by reading the voltage at output terminal L1.

Of course, the output of the monitor can be regarded as a current value instead of a voltage value. For example, a resistance may be placed between a output terminal L1, L2, . . . Ln and ground and, as long as the circuit is not overloaded, the current through the resistor will be indicative of the light-level detected. If it is desirable to monitor a current value instead of a voltage value, then to achieve a higher current level a current amplifier, such as a 2N3704 transistor, may be interposed in the operational amplifier output line, with the transistor's base connected to the operational amplifier output terminal 34, the emitter to the output line 26 as, and the collector to positive power line 28. This boosts the current driving capability to 50 milliamperes. Thus, in the preferred embodiment, a 0–20 milliamp current through a 250 ohm resistor would represent 0–500 footcandles respectively.

Tests have shown this output to be linear within 1%, in the 25 to 360 footcandle range which is more sensitive than the human eye can detect. The monitoring system may be calibrated upon installation or later at a convenient time. Once the monitoring system for each location is calibrated, it does not require further adjustment.

A lighting controller connected to the output terminals L1, L2, . . . Ln at the control unit 60 and to the lighting circuits can control the light intensity in each location. If the voltages at output terminals L1, L2, . . . Ln are all calibrated to have the same voltage-to-light-intensity, ratio, then the controller does not have to decipher each signal and the controller can therefore be less sophisticated and less complicated than if each signal had its own slope.

Because the system of the preferred embodiment of the present invention allows the use of low voltage and low power connecting wiring which is classed under Article 725 of the National Electrical Code as Class 2, no conduit is needed and the connecting wire can be easily installed in building that are already constructed.

The system of the preferred embodiment also allows connecting lines 40 to be ordinary, 26-gauge color-coded telephone cable. Such cable is readily available and relatively quite inexpensive and color-coding simplifies installation. Because connecting lines constitute a large expense in similar monitoring systems, the present system is considerably less expensive.

The configuration of the system of the present invention allows a single power supply for a plurality of sensors. This contributes to the simplicity and also reduces costs.

The system of the present invention is readily adaptable to incorporate "Contrast Control" as disclosed in U.S. Pat. No. 4,229,664 for PHOTOELECTRIC METHODS AND APPARATUS FOR REGULATING ELECTRICAL POWER CONSUMPTION IN STORES, issued Oct. 21, 1980.

In operation of light-level control as described in this invention, one sensor is usually installed outside the building to register the ambient outside light. This sensor has a double purpose, to control outside nighttime lighting and to furnish the reference signal for "Contrast Control" correction of inside lighting. Through the software of the microprocessor controller, the level of the outside light is compared with the inside light sensing at any locality in the building. The final light level control signal supplied is based on the "Contrast Control" schedule that has been programmed into the controller for any particular indoor sensor location. As an example, the closer the inside sensor location is to the window area and the higher the level of outside light, the greater would be the correction. The artificial light near the window areas would be automatically increased in daylight hours to compensate for the narrowing of the eye pupils of personnel in the area. Thus "Contrast Control" compensates for the effects of daylight "glare" coming in the windows. At night the light levels in these same areas are reduced to hold the same level of "real" light that the eyes of the personnel in the area actually "see". "Contrast Control" is not only a power saver but increases the efficiency of personnel working in daylight illuminated areas.

From the foregoing description, it will be seen that the present invention provides an extremely simple, efficient, and reliable manner of monitoring the level of light in a plurality of locations from a central location.

Although a particular embodiment of the invention has been illustrated and described, modifications and changes will become apparent to those skilled in the art, and it is intended to cover in the appended claims such modifications and changes as come within the true spirit and scope of the invention.

I claim:

1. A system for remote monitoring of light levels, comprising:

at least one sensor unit each remotely located from a central location, each sensor unit comprising:

(a) sensor means for sensing the level of light at a remote location and for providing a sensor signal linearly proportional to the sensed level of light;

(b) isolation means responsive to said sensor signal for isolating said sensor signal from electrical noise and for providing a noise-free output signal proportional to said sensor signal, said isolation means including feedback means for establishing the ratio of said output signal to said sensor signal; and a control unit located at said central location comprising:

(a) at least one interconnect means, each for receiving a corresponding sensor unit output signal and for providing the received output signal from said control unit; and (b) at least one calibration means each coupled to a corresponding sensor unit feedback means for modifying the ratio of the output signal to the sensor signal of the corresponding sensor unit.

2. The system of claim 1 wherein said control unit further comprises a power supply for providing power to each sensor unit.

3. The system of claim 1 wherein each sensor unit comprises:

a photodiode;

an operational amplifier having a pair of inputs and an output, said photodiode coupled across said inputs;

a feedback network coupled between said output and one of said inputs, said feedback network for coupling to a corresponding calibration means; and wherein a voltage developed across said photodiode is linearly proportional to the level of light at the remote location and said operational amplifier amplifies the voltage developed across said photodiode, at a gain determined by the resistance of said feedback network and said calibration means, and provides an output voltage as said sensor unit output signal.

4. The system of claim 3 wherein each sensor means further comprises driver means coupled to said output for converting said output voltage to an output current and for providing said output current as said sensor unit output signal.

5. A system for remote monitoring of light levels comprising:

at least one sensor means each remotely located from a central location for sensing the level of light at a remote location and for providing an output signal linearly proportional to the sensed level of light; and a control unit located at a central location comprising:

(a) at least one interconnect means each for receiving a corresponding sensor means output signal and for providing the received output signal from said control unit;

(b) at least one calibration means each coupled to a corresponding sensor means for modifying the proportionality of the output signal to the level of light sensed by the corresponding sensor means; and (c) a power supply for providing power to each sensor means.

6. The system of claim 5 wherein each sensor means comprises:

a photodiode;

an operational amplifier having a pair inputs and an output, said photodiode coupled across said inputs;

a feedback network coupled between said output and one of said inputs, said feedback network for coupling to a corresponding calibration means; and wherein a voltage developed across said photodiode is linearly proportional to the level of light at the remote location and said operational amplifier amplifies the voltage developed across said photodiode, at a gain determined by the resistance of said feedback network and said calibration means, and provides an output voltage as said sensor means output signal.

7. The system of claim 6 wherein each of said interconnect means comprises a terminal.

8. The system of claim 7 wherein each of said calibration means comprises potentiometer having a pair of leads and an adjustment contact, one of said leads coupled to a corresponding terminal, the other of said leads coupled to the other of said inputs and said adjustment contact coupled said feedback network.

9. The system of claim 8 wherein each sensor means further comprising driver means coupled to said output for converting said output voltage to an output current and providing said output current as said sensor means output signal.

10. A system for remote monitoring of light levels, comprising;

at least one sensor unit each remotely located from a central location, each sensor unit comprising:

(a) sensor means for sensing the level of light at a remote location and for providing a sensor signal linearly proportional to the sensed level of light;

(b) isolation means responsive to said sensor signal for isolating said sensor signal from electrical noise and for providing a noise-free output signal proportional to said sensor signal, said isolation means including feedback means for establishing the ratio of said output signal to said sensor signal; and a control unit located at said central location comprising:

(a) at least one interconnect means, each for receiving a corresponding sensor unit output signal and for providing the received output signal from said control unit;

(b) at least one calibration means each coupled to a corresponding sensor unit feedback means for modifying the ratio of the output signal to the sensor signal of the corresponding sensor unit; and (c) a power supply for providing power to each sensor unit.

11. The system of claim 10 wherein each sensor means comprises:

a photodiode;

an operational amplifier having a pair inputs and an output, said photodiode coupled across said inputs;

a feedback network coupled between said output and one of said inputs, said feedback network for coupling to a corresponding control unit calibration means; and wherein a voltage developed across said photodiode is linearly proportional to the level of light at the remote location and said operational amplifier amplifies the voltage developed across said photodiode, at a gain determined by the resistance of said feedback network and said calibration means, and provides an output voltage as said sensor unit output signal.

12. The system of claim 11 wherein each of said interconnect means comprising a terminal and each of said calibration means comprises potentiometer having a pair of leads and an adjustment contact, one of said leads coupled to a corresponding terminal, the other of said leads coupled to the other of said inputs and said adjustment contact coupled said feedback network.

13. The system of claim 12 wherein each sensor unit further comprises driver means coupled to said output for converting said output voltage to an output current and for providing said output current as said sensor unit output signal.

*14. A light sensor unit for monitoring the level of light at a certain remote location, said sensor unit being operative to output an electrical analog signal to a central location, said signal being indicative of said light level, and having a voltage no greater than 30 volts and an amperage no greater than 8 amps, said unit comprising:* a photodiode received in said light sensor unit and having an input lead and an output lead; and an operational amplifier also received in said light sensor unit and having a negative input terminal connected to said photodiode output lead, and a positive input terminal connected to said photodiode input lead, said amplifier further having an output line operable to output said electrical analog signal, wherein said photodiode input and output leads are sufficiently short to permit said amplifier to substantially isolate noise and current sensitive characteristics of said photodiode.

*15. The sensor unit of claim 14, including means, received in said light sensor unit and positioned adjacent said operational amplifier, for suppressing electrical noise and oscillation in said electrical analog signal.*

*16. The sensor unit of claim 15, wherein said noise and oscillation suppression means includes a resistance connected across said negative input terminal of said amplifier and said output line, and a capacitance connected in parallel across said resistance.*

*17. The sensor unit of claim 16, wherein said photodiode input and output leads each have a length no greater than substantially one-quarter of an inch.*

*18. The sensor unit of claim 17, wherein said photodiode input and output leads each have a length no greater than substantially one-eighth of an inch.*

*19. The sensor unit of claim 14, wherein said photodiode input and output leads each have a length no greater than substantially one-quarter of an inch.*

*20. The sensor unit of claim 19, wherein said photodiode input and output leads each have a length no greater than substantially one-eighth of an inch.*

*21. A light sensor unit for monitoring the level of light at a certain remote location, said sensor unit being operative to output an electrical analog signal to a central location, such signal indicating the amount of light sensed by said sensor at said remote location, said signal having a voltage no greater than 30 volts and an amperage no greater than 8 amps, said unit comprising:* a photodiode received in said light sensor unit and having an input lead and an output lead;

an operational amplifier received in said light sensor unit and having a negative input terminal connected to said photodiode output lead, and a positive input terminal connected to said photodiode input lead, said amplifier further having an output line operable to output said electrical analog signal, wherein said photodiode input and output leads are sufficiently short to permit said amplifier to substantially isolate noise and current sensitive characteristics of said photodiode; and means, received in said light sensor unit and positioned adjacent said operational amplifier, for suppressing electrical noise oscillation in said electrical analog signal.

*22. The sensor unit of claim 21, wherein said noise and oscillation suppression means includes a resistance connected across said negative input terminal of said amplifier and said output line, and a capacitance connected in parallel across said resistance.*

*23. The sensor unit of claim 21, wherein said photodiode input and output leads each have a length no greater than substantially one-quarter of an inch.*

*24. The sensor unit of claim 21, wherein said photodiode input and output leads each have a length no greater than substantially one-eighth of an inch.*

* * * * *